(12) United States Patent
Michniewicz et al.

(10) Patent No.: US 6,268,923 B1
(45) Date of Patent: Jul. 31, 2001

(54) OPTICAL METHOD AND SYSTEM FOR MEASURING THREE-DIMENSIONAL SURFACE TOPOGRAPHY OF AN OBJECT HAVING A SURFACE CONTOUR

(75) Inventors: Mark A. Michniewicz, Highland; Matthew P. Frazer, Plymouth, both of MI (US)

(73) Assignee: Integral Vision, Inc., Farmington Hills, MI (US)

( * ) Notice: Subject to any disclaimer, the term of this patent is extended or adjusted under 35 U.S.C. 154(b) by 0 days.

(21) Appl. No.: 09/414,352

(22) Filed: Oct. 7, 1999

(51) Int. Cl.$^7$ ........................................... G01B 9/02
(52) U.S. Cl. .................................................. 356/512
(58) Field of Search .................................. 356/511, 512, 356/489, 495, 376; 250/237 G

(56) References Cited

U.S. PATENT DOCUMENTS

| | | | |
|---|---|---|---|
| 4,794,550 | * 12/1988 | Greivenkamp | ........................ 356/512 |
| 4,942,618 | 7/1990 | Sumi et al. . | |
| 5,069,548 | 12/1991 | Boehnlein . | |
| 5,202,749 | * 4/1993 | Pfister | ................................ 356/376 |
| 5,307,152 | 4/1994 | Boehnlein et al. . | |
| 5,416,591 | 5/1995 | Yoshimura et al. . | |
| 5,608,529 | 3/1997 | Hori . | |
| 5,646,733 | 7/1997 | Bieman . | |
| 5,774,221 | 6/1998 | Guerra . | |
| 5,793,900 | 8/1998 | Nourbakhsh . | |
| 5,852,672 | 12/1998 | Lu . | |
| 5,880,844 | 3/1999 | Seng . | |

FOREIGN PATENT DOCUMENTS

3934423  * 4/1991 (DE) .

OTHER PUBLICATIONS

Bieman, et al., 3D Imaging Using A Unique Refractive Optic Design to Combine Moire and Stereo, SPIE, vol. 3204.

* cited by examiner

*Primary Examiner*—Samuel A. Turner
(74) *Attorney, Agent, or Firm*—Brooks & Kushman P.C.

(57) ABSTRACT

An optical method and system for measuring three-dimensional surface topography by providing high resolution contour measurements of an object using interferometric methods. The invention utilizes co-sight detector technology to provide at least three independent images of exactly the same object location, with a known fringe pattern optically introduced to each of the images. Each of the fringe patterns have a known phase difference relative to the phase appearing on each of the other images. Furthermore, the images have the same perspective relative to the object and may be collected simultaneously. This simultaneous collection of multiple phase images allows very high speed 3D data generation. Previous limitations of phase shift technology such as sample motion and vibration can be eliminated. The method may use continuous or strobed illumination. In addition, the system can be built without moving parts of any kind, resulting in a cheaper assembly, with improved repeatability over previous phase shifting techniques.

20 Claims, 2 Drawing Sheets

OPTICAL METHOD AND SYSTEM FOR MEASURING THREE-DIMENSIONAL SURFACE TOPOGRAPHY OF AN OBJECT HAVING A SURFACE CONTOUR

TECHNICAL FIELD

This invention relates to an optical method and system for measuring three-dimensional surface topography and, in particular, to an optical method and system for measuring three-dimensional surface topography utilizing interference fringe technology.

BACKGROUND ART

Phase shifting interferometry is a well-known (Kreath) technique by which surface contour maps may be generated. Various optical techniques may be used to produce a contour or "fringe" map of the surface to be quantified. Coherent interferometers and moiré interferometers are among the most common types of full field surface contouring devices. Phase-shifted interferometry increases the resolution of the depth measurement of the raw fringe contour map, as well as sense of slope. Phase shifting is traditionally implemented by digitizing multiple images of a sample object with a CCD video camera. Each image is captured with a slight change in the phase of the interferometric contour map. Phase shift analysis is applied to the images. This phase shift analysis computes a relative contour map of the object surface. A common phase shift analysis is referred to as a "bucket" algorithm, where each phase image is referred to as a "bucket". A minimum number of 3 buckets is typically required for the bucket algorithm.

Between each bucket image, translating the position of one or more optical components traditionally changes the phase. This translation may occur specifically between each image capture or "on the fly" with a precise velocity control timed to the data rate of the CCD camera. In the case of a moiré interferometer, the translated object is usually one of the gratings although other components may be translated. (See, U.S. Pat. Nos. 5,069,548 and 5,646,733, described in greater detail hereinbelow). Coherent interferometers manipulate the reference optical path length by moving a reference mirror or window.

It is critical to the success of the phase shift that the object and the optical system remain completely stationary with respect to each other. Vibrations and/or motion of the object will degrade the quality of the data. In some cases, such motion can actually cause the system to fail.

In many instances, particularly in process inspection of manufactured products, the precision surface contour of phase shifting interferometry may be desirable. However, the length of time required to produce a number of bucket images while the object is held stationary relative to the optical system precludes its use.

In addition, variations in the phase shifting mechanism, such as backlash, part wear, and drifts in the timing sequence, will cause non-linearity and changes in the accuracy of the machine, which degrade the repeatability of the measurement.

U.S. Pat. No. 5,880,844 discloses a method to detect the height of features in an image by the difference in the degree of focus at each of the detectors, which are aligned such that their planes of best focus are at different locations in the object space.

U.S. Pat. No. 5,793,900 discloses a method identical to U.S. Pat. No. 5,880,844. Differences include the image processing and field of view size. U.S. Pat. No. 5,793,900 seeks to map topography on a scale suitable for robot guidance while U.S. Pat. No. 5,880,844 is a microscopy technique. However, the fundamental principle remains height mapping based on the quality of focus.

U.S. Pat. No. 4,942,618 discloses an optical configuration substantially identical to those disclosed in the patents noted immediately above. In this patent, the image processing is based on contrast and size of objects in the image rather than on sharpness of the objects. The image processing is based on the assumption that the object being measured is known to be a wire or like object.

U.S. Pat. No. 5,852,672 discloses a technique that is based on stereo imaging. This method requires that each of at least two cameras are positioned such that they are observing the same object space, but from distinct points of view. Projected line or grating patterns are added as an enhancement to the stereo technique.

U.S. Pat. No. 5,774,221 discloses the use of phase-controlled evanescent illumination. The patent discusses methods for controlling or manipulating the phase of inhomogeneous waves. The patent further discusses methods for applying this technology to the measurement of surface microtopography. Two detectors are positioned at two specific locations. One system detects diffuse type reflections, the other collects specular type reflections. Further, the principle utilized is based on detecting the phase of the illumination light waves.

U.S. Pat. No. 5,416,591 is a scanning laser technique that references an array sensor, and three-dimensional surface mapping. The method is common to flying spot laser scanners. It is unique in that it has the capability of scanning in two dimensions, hence the reference to the array sensor (basically a CCD array), rather than a line sensor. The method actually uses only one plane of focus for the detector(s); each individual element of the array is sensing a separate location in the image plane.

U.S. Pat. No. 5,069,548 describes a method of translating the entire grating projection system as a means of obtaining absolute depth measurements as opposed to the traditional relative surface measure. The system does not employ multiple cameras, and requires moving parts of the system to obtain its data.

U.S. Pat. No. 5,307,152 discloses two cameras which view an object area from two separate positions. The cameras are completely independent of one another. This method relies on traditional phase-shifted moiré techniques including physical translation of the grating.

U.S. Pat. No. 5,646,733 discloses a method and system including an optical head which moves relative to an object at a vision station to scan a projected pattern of imagable electromagnetic radiation across the surface of an object to be inspected at a relatively constant linear rate to generate an imagable electromagnetic radiation signal.

U.S. Pat. No. 5,608,529 discloses a system which projects a pattern onto the object being observed. The projection is done in such a way that the pattern is in focus at three discrete depth locations in the object space. The three patterns are observed with three separate detectors, each aligned such that they have discrete planes of observation in the object space. This patent discloses depth measurement by common triangulation techniques, while extending the depth range by observing the quality of the focus at discrete image locations.

SPIE Vol. 3204 includes a paper entitled "3D Imaging Using A Unique Refractive Optic Design To Combine Moiré and Stereo" authored by L. Bieman and K. Harding. The technique described therein has a limited inspection area which is equal to or less than the diameter of the main imaging lens. In addition, resolution is limited to ⅓ the detector area.

DISCLOSURE OF INVENTION

An object of the present invention is to provide an optical method and system for measuring three-dimensional surface topography to make a surface contour map of an object surface based on high-resolution phase-shifted interferometer images, wherein a traditional interferometer design may be modified to allow the introduction of multiple co-sight CCD detectors.

Another object of the present invention is to provide an optical method and system for measuring three-dimensional surface topography wherein a unique optical design allows the simultaneous acquisition of all of the phase-shifted images necessary for bucket phase calculations.

Yet another object of the present invention is to provide an optical method and system for measuring three-dimensional surface topography wherein the system has a unique interferometer optical geometry which provides high-resolution phase-shifted images with no moving parts or active elements and which avoids stereo methods.

Further, another object of the present invention is to provide an optical method and system for measuring three-dimensional surface topography including a mechanism to effectively operate a real-time 3D camera, thereby producing a calibrated surface depth map of an object at the data rates of a standard CCD array.

In addition, an object of the present invention is to provide an optical method and system for measuring three-dimensional surface topography wherein the system may be a strobe-based system, which eliminates the dependence on a stationary part and interferometer relationship while phase images are collected. This technique eliminates system failures due to vibration or part translation.

Finally, an object of the present invention is to provide an optical method and system for measuring three-dimensional surface topography including a practical mechanism for the calculation and calibration of differences in multiple CCD array detectors' gain and offset.

In carrying out the above objects and other objects of the present invention, an optical method for measuring three-dimensional surface topography of an object having a surface contour is provided. The method includes projecting a predetermined pattern of light on a surface of the object to generate a corresponding reflected light signal. The method also includes generating a plurality of images from the reflected light signal in a plurality of separate but optically coincident detector planes wherein each of the images includes a fringe pattern thereon having a known phase shift different from each of the other phase shifts. The method further includes measuring radiant energy in the images in the plurality of detector planes to produce a plurality of signals. The method finally includes processing the plurality of signals to obtain a surface contour map of the object.

In one embodiment, the predetermined pattern of light is a predetermined patterned image and the corresponding reflected light signal is a distorted patterned image. The step of generating includes the step of receiving the distorted pattern image with a plurality of optical components to obtain the plurality of images in the separate detector planes.

In another embodiment, the predetermined pattern of light is a collimated light beam and the corresponding reflected light signal is non-planar as a function of the surface contour. The collimated light beam may be a laser beam. The step of generating includes the steps of creating a plurality of planar reference light signals based on the collimated light beam and combining the plurality of planar reference light signals with the non-planar reflected light signal to obtain the plurality of images in the separate detector planes.

The fringe pattern is preferably a moiré fringe pattern.

Further in carrying out the above objects and other objects of the present invention, a system for measuring three-dimensional surface topography of an object having a surface contour is provided. The system includes a mechanism for projecting a predetermined pattern of light on a surface of the object to generate a corresponding reflected light signal. The system also includes a mechanism for generating a plurality of images from the reflected light signal in a plurality of separate detector planes wherein each of the images includes a fringe pattern thereon having a known phase shift different from each of the other phase shifts. The system further includes a plurality of photodetectors for measuring radiant energy in the images in the plurality of detector planes to produce a plurality of signals wherein the photodetectors are aligned such that they are optically coincident. The system finally includes a signal processor for processing the plurality of signals to obtain a surface contour map of the object. The surface contour map may be a phase-shifted moiré depth map.

Preferably, each of the plurality of photodetectors includes a CCD detector having a plurality of sensing elements and wherein corresponding sensing elements of the CCD detectors sense exactly the same surface image from the same point of view at the same time.

In one embodiment, the predetermined pattern of light is a predetermined patterned image and the corresponding reflected light signal is a distorted patterned image. The mechanism for generating includes a plurality of optical components to obtain the plurality of images in the separate detector planes. The plurality of optical components may include a plurality of gratings such as Ronchi gratings. The gratings are adjusted so that the fringe patterns have the known phase shifts. The mechanism for projecting is preferably a grating projector.

In another embodiment, the predetermined pattern of light is a collimated light beam and wherein the corresponding reflected light signal is non-planar as a function of the surface contour. The collimated light beam may be a laser beam. The mechanism for generating includes a mechanism for creating a plurality of planar reference light signals and a mechanism for combining the plurality of planar reference light signals with the non-planar reflected light signal to obtain the plurality of images in the separate detector planes.

The fringe pattern is preferably a moiré fringe pattern and the surface contour map is a phase-shifted moiré depth map.

The mechanism for projecting may be an optical projector.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
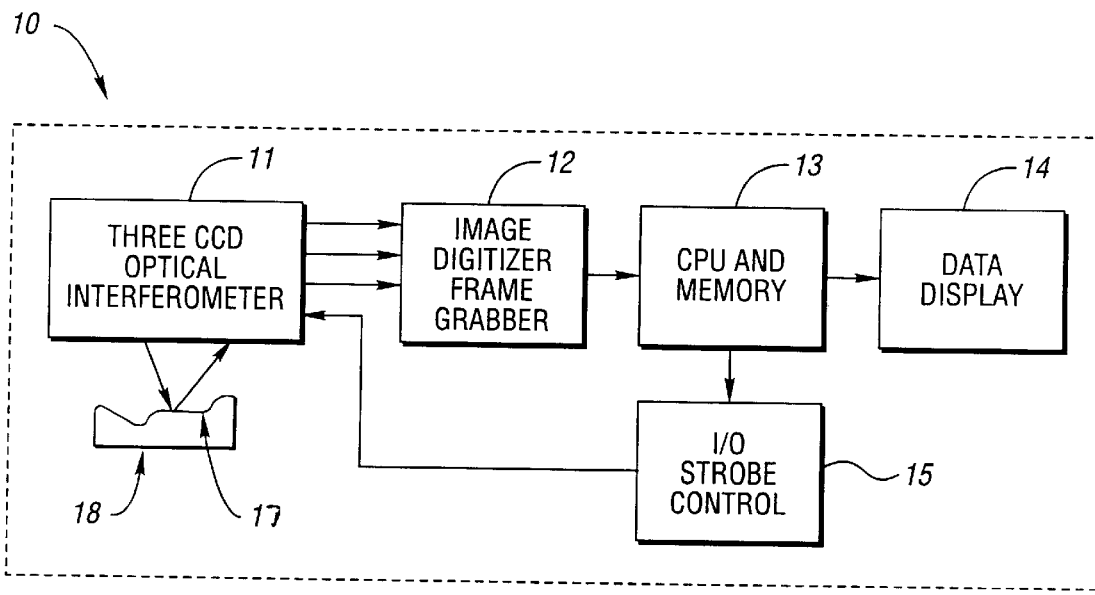
FIG. 1 is a schematic view of a machine vision system including an optical head for carrying out the method and system of the present invention.

Referring now to the drawing Figures, in FIG. 1 there is generally indicated at 10 a machine vision system for carrying out the present invention. In general, the system 10 includes an optical head generally indicated at 11 which preferably includes a three CCD optical interferometer. In accordance with typical interferometer systems, either coherent illumination, or a pattern of structured light is projected onto a surface 17 of an object 18. Each of three (or more) CCD cameras or detectors included in the head 11 simultaneously image the surface 17 of the object 18 and transfer the analog images to a digitizer or frame grabber board 12. The digitized images are then transferred to a CPU 13 having memory and a bucket algorithm is performed thereat to calculate a depth or surface contour map of the surface 17. The images or data may be displayed on a monitor or data display 14. An I/O subsystem 15 in the form of an I/O strobe control may be included to communicate decisions or input start signals. In addition, the I/O subsystem 15 may be used to strobe the light source simultaneous to the detector data rate from the head 11.

Figure 2:
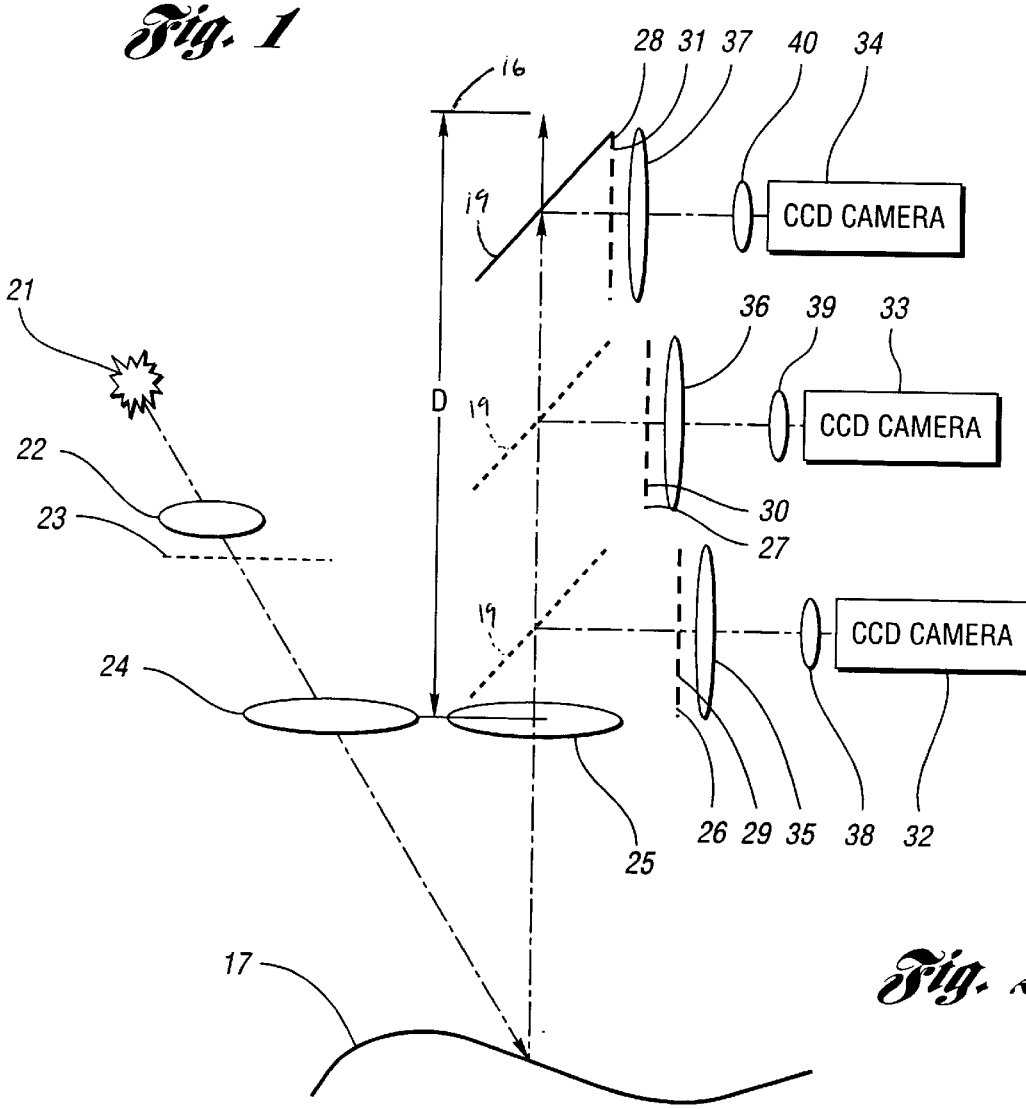
FIG. 2 is a schematic view of a moiré interferometer optical system utilizing phase-shifted, co-sight detectors.

FIG. 2 is a schematic view of the optical head 11 which is preferably a moiré-type interferometer optical head 11 employing co-sight detector phase shifting of the present invention. Included in the head 11 is an optical projector comprising of a light source 21, a condenser optic 22, a grating such as a Ronchi grating 23, and a projection lens 24. The elements of the projector are aligned such that an image of the Ronchi ruling, projected from some angle, appears on the surface of object 17. At surface 17, the projected pattern is distorted as a function of and the contour of the surface 17.

An imaging lens 25 re-images the distorted pattern to an image plane 16 some distance D behind the lens 25. Beam splitters 19 are placed along the optical axis of the lens 25 to produce multiple image planes at optical distance D behind the lens 25. In this manner three or more image planes 26, 27, and 28 including exactly the same image may be created.

Ronchi gratings 29, 30 and 31, each of the same frequency, and matched to the frequency of the imaged Ronchi rulings are placed at the image planes 26, 27 and 28, respectively, created by the beam splitters 19. The Ronchi gratings 29, 30 and 31, aligned to be co-incident with the plane of the object images, produce moiré fringe patterns indicating the contour of the surface 17.

The moiré images created at each of the image planes 26, 27 and 28 are then relayed to detector planes within independent CCD camera arrays shown at 32, 33 and 34 via relay lens 35, 36, 37 and camera lens 38, 39 and 40, respectively. Each camera array views exactly the same image of the part except for the fringe pattern superimposed on the image.

An image or signal processor including the board 12 transfers each camera image into the CPU memory within block 13. In the case of the three camera system or head 11, the digitized image from one camera 32 is stored in the CPU memory as bucket 1 image. The remaining digitized images from cameras 33 and 34 are stored as bucket 2 and bucket 3, respectively.

Each of the Ronchi gratings 29, 30 and 31 is adjusted such that there is a known phase difference in the moiré pattern between the digitized images stored in bucket 1, bucket 2, and bucket 3. In this way, all images necessary to execute a standard three-bucket phase algorithm may be collected simultaneously. The output of the three-bucket algorithm is a raw phase map, which is analogous to the real surface contour of the sample inspected.

A common three-bucket algorithm would produce for each CCD pixel location a phase number from the equation:

$$\Phi(x, y) = \operatorname{atan} \frac{B3(x, y) - B2(x, y)}{B1(x, y) - B2(x, y)}$$

where B1, B2 and B3 represent gray level values from a pixel in the bucket 1, bucket 2 and bucket 3, respectively. However, the derivation assumes a constant phase change from bucket-to-bucket image. Furthermore, since typical systems would use the same CCD array to collect the bucket images a constant detector gain and offset is assumed.

The present invention typically uses three or more independent cameras 32, 33 and 34, each with its own inherent character to obtain these bucket images. Accurate calculation of the phase change independently introduced to each camera is important to the success of the technique. Furthermore, the relative offset and gain differences between each of the CCD cameras 32, 33 and 34 must be quantified and compensated. In addition, given the aforementioned quantities, the typical three bucket algorithm should be modified to allow for correction using the terms:

$$\Phi(x, y) := \operatorname{atan}\left[\frac{(B3-B2)\cdot\cos(P1)+(B1-B3)\cdot\cos(P2)+(B2-B1)\cdot\cos(P3)}{(B3-B2)\cdot\sin(P1)+(B1-B3)\cdot\sin(P2)+(B2-B1)\cdot\sin(P3)}\right]$$

where P1, P2 and P3 represent the phase of the fringe pattern in each of the bucket images. Further, the above equation assumes each of the bucket images have already been normalized for the camera response.

In the preferred method for obtaining the data needed to properly compensate the images and phase data, three-bucket images are collected from a known reference surface. Each bucket image is Fourier transformed and its DC and AC components representing the fringe data are extracted. The DC and AC information is then separately inverse transformed. The average DC component of a bucket image may be used to adjust the intensity gain and offset relative to the other buckets.

The AC information can be used to calculate the position of the reference fringe pattern in each bucket image. The fringe can be fitted and the phase of each bucket image may be reported. This information can be used to adjust the position of the fringe pattern in each bucket image to obtain a desired phase change per bucket. In addition, this information may be used in the bucket algorithm to compensate for known phase error.

OEM equipment vision boards are available that are able to simultaneously collect images from three cameras. In addition, embedded electronics, or other specialized hardware may be employed to perform the three-bucket algorithm as a look-up table. In this manner, the three-bucket algorithm may be executed on the three images at speeds consistent with the camera data rate, producing "real-time" surface contour maps.

Although the example of the head 11 shows three cameras and describes the use of a three-bucket algorithm, more cameras and a corresponding bucket calculation may be easily employed using the same methods.

Figure 3:
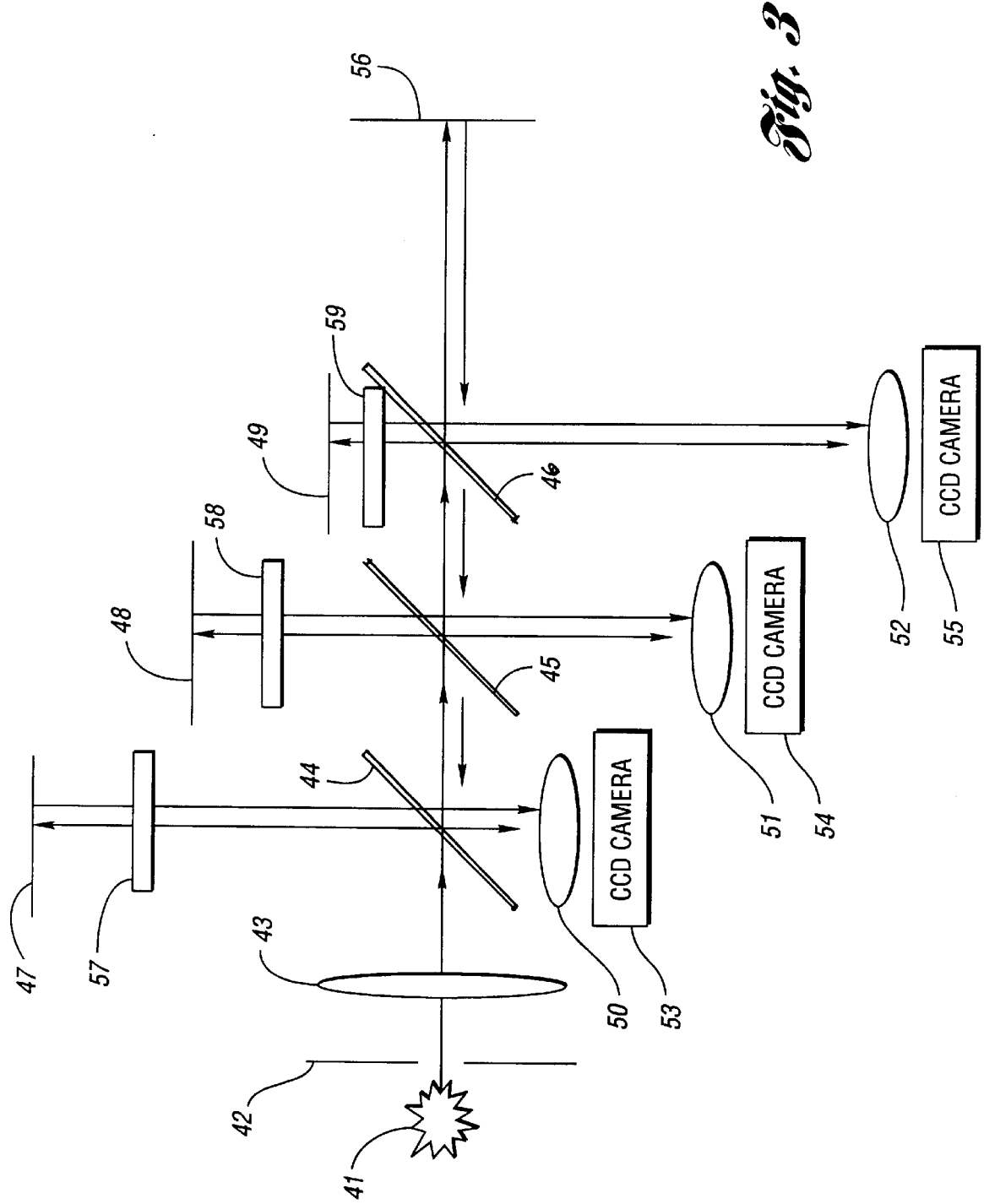
FIG. 3 is a schematic view of a typical coherent interferometer, in this case a Michelson type, which has been reconfigured to accommodate co-sight, detector phase shifting of the present invention.

Referring again to FIG. 1, the co-sight 3CCD techniques and corresponding image processing and algorithm described above may be applied to alternate types of interferometers. One example is shown in FIG. 3, which depicts a co-sight detector coherent interferometer, an improved version of a Michelson or Twyman-Green interferometer.

A coherent source 41 emits light through a pinhole 42 and a collimating lens 43 to provide an incoming source of plane waves to the interferometer. Beamsplitters 44, 45 and 46 direct or divert a percentage of the wavefront to reference surfaces 47, 48 and 49. These surfaces 47, 48 and 49 are typically formed by plane mirrors which reflect the light to observing CCD cameras or arrays 53, 54 and 55 via imaging lenses 50, 51 and 52, respectively. Again in this example, a minimum of three CCD cameras or arrays is required. However, more may be used.

The undeviated portion of the original wavefront continues until it is incident on the object's surface 56. The reflected wavefront is no longer planar, but is returned in its deviated state to each of the beamsplitters 44, 45 and 46 where they are combined with the reflected reference plane wavefronts. At the detector locations, interference patterns appear in which fringe patterns relative to changes in the contour of the surface 56 may be observed.

As in the aforementioned moiré system, it is important that a known phase shift in the fringe pattern be observed at the detector planes in each of the three CCD cameras 53, 54 and 55. Each of the reference optical paths may be varied by a known optical path length difference to introduce this phase shift. The change in optical path difference can be added by shifting the mirrors so that the distance to their surfaces 47, 48 and 49 change by known fractions of the source wavelength.

Further, the optical path difference could be altered in each path by the placement of windows 57, 58 and 59 in the reference paths. These windows 57, 58 and 59 can be of different thicknesses, providing the reference phase difference or they may be of the same thickness with each window rotated slightly for an effective change in the optical path length.

The three cameras 53, 54 and 55 produce one bucket image each, which is transferred to the CPU 13 for processing in the same method as described above.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An optical method for measuring three-dimensional surface topography of an object having a surface contour, the method comprising:

projecting a predetermined pattern of light on a surface of the object to generate a corresponding reflected light signal;

generating a plurality of images from the reflected light signal in a plurality of separate but optically coincident detector planes of detectors, each of the detectors having a gain and an offset and wherein each of the images includes a fringe pattern thereon having a known phase shift different from each of the other phase shifts;

determining relative offset and gain differences of the detectors;

compensating for the gain and offset of at least one of the detectors based on the offset and gain differences;

measuring radiant energy in the images in the plurality of detector planes to produce a plurality of signals; and processing the plurality of signals to obtain a surface contour map of the object.

2. The method as claimed in claim 1 wherein the predetermined pattern of light is a predetermined patterned image and wherein the corresponding reflected light signal is a distorted patterned image.

3. The method as claimed in claim 2 wherein the step of generating includes the step of receiving the distorted patterned image with a plurality of optical components to obtain the plurality of images in the separate detector planes.

4. The method as claimed in claim 1 wherein the predetermined pattern of light is a collimated light beam and wherein the corresponding reflected light signal is non-planar as a function of the surface contour.

5. The method as claimed in claim 4 wherein the collimated light beam is a laser beam.

6. The method as claimed in claim 4 wherein the step of generating includes the steps of creating a plurality of planar reference light signals based on the collimated light beam and combining the plurality of planar reference light signals with the non-planar reflected light signal to obtain the plurality of images in the separate detector planes.

7. The method as claimed in claim 1 wherein the fringe pattern is a moiré fringe pattern.

8. A system for measuring three-dimensional surface topography of an object having a surface contour, the system comprising:

means for projecting a predetermined pattern of light on a surface of the object to generate a corresponding reflected light signal;

means for generating a plurality of images from the reflected light signal in a plurality of separate detector planes wherein each of the images includes a fringe pattern thereon having a known phase shift different from each of the other phase shifts;

a plurality of photodetectors for measuring radiant energy in the images in the plurality of detector planes to produce a plurality of signals wherein the photodetectors are aligned such that they are optically coincident and wherein each of the photodetectors has a gain and an offset;

means for determining relative offset and gain differences of the photodetectors;

means for compensating for the gain and offset of at least one of the photodetectors based on the gain and offset differences; and a signal processor for processing the plurality of signals to obtain a surface contour map of the object.

9. The system as claimed in claim 8 wherein each of the plurality of photodetectors includes a CCD detector having a plurality of sensing elements and wherein corresponding sensing elements of the CCD detectors sense exactly the same surface image from the same point of view at the same time.

10. The system as claimed in claim 8 wherein the predetermined pattern of light is a predetermined patterned image and wherein the corresponding reflected light signal is a distorted patterned image.

11. The system as claimed in claim 10 wherein the means for generating includes a plurality of optical components to obtain the plurality of images in the separate detector planes.

12. The system as claimed in claim 11 wherein the plurality of optical components include a plurality of gratings wherein the gratings are adjusted so that fringe patterns have the known phase shifts.

13. The system as claimed in claim 8 wherein the predetermined pattern of light is a collimated light beam and wherein the corresponding reflected light signal is non-planar as a function of the surface contour.

14. The system as claimed in claim 13 wherein the collimated light beam is a laser beam.

15. The system as claimed in claim 13 wherein the means for generating includes means for creating a plurality of planar reference light signals and means for combining the plurality of planar reference light signals with the non-planar reflected light signal to obtain the plurality of images in the separate detector planes.

16. The system as claimed in claim 8 wherein the fringe pattern is a moiré fringe pattern.

17. The system as claimed in claim 8 wherein the surface contour map is a phase-shifted moiré depth map.

18. The system as claimed in claim 8 wherein the means for projecting is an optical projector.

19. An optical method for measuring three-dimensional surface topography of an object having a surface contour, the method comprising:

projecting a predetermined pattern of light on a surface of the object to generate a corresponding reflected light signal;

generating a plurality of images from the reflected light signal in a plurality of separate but optically coincident detector planes wherein each of the images includes a fringe pattern thereon having a known phase shift different from each of the other phase shifts;

measuring radiant energy in the images in the plurality of detector planes to produce a plurality of signals; and processing the plurality of signals to obtain a surface contour map of the object wherein the predetermined pattern of light is a collimated light beam and wherein the corresponding reflected light signal is non-planar as a function of the surface contour and wherein the step of generating includes the steps of creating a plurality of planar reference light signals based on the collimated light beam and combining the plurality of planar reference light signals with the non-planar reflected light signal to obtain the plurality of images in the separate detector planes.

20. A system for measuring three-dimensional surface topography of an object having a surface contour, the system comprising:

means for projecting a predetermined pattern of light on a surface of the object to generate a corresponding reflected light signal;

means for generating a plurality of images from the reflected light signal in a plurality of separate detector planes wherein each of the images includes a fringe pattern thereon having a known phase shift different from each of the other phase shifts;

a plurality of photodetectors for measuring radiant energy in the images in the plurality of detector planes to produce a plurality of signals wherein the photodetectors are aligned such that they are optically coincident; and a signal processor for processing the plurality of signals to obtain a surface contour map of the object wherein the predetermined pattern of light is a collimated light beam and wherein the corresponding reflected light signal is non-planar as a function of the surface contour and wherein the means for generating includes means for creating a plurality of planar reference light signals and means for combining the plurality of planar reference light signals with the non-planar reflected light signal to obtain the plurality of images in the separate detector planes.

* * * * *